Feb. 13, 1962   R. W. LA WARRE ET AL   3,021,402
SPEED RESPONSIVE SWITCH

Filed Nov. 30, 1959   2 Sheets-Sheet 1

INVENTORS
Robert W. LaWarre
Myron D. Markley
BY Owen & Owen
ATTORNEYS

INVENTORS
Robert W. LaWarre
Myron D. Markley
BY Owen & Owen
ATTORNEYS

United States Patent Office 3,021,402
Patented Feb. 13, 1962

3,021,402
SPEED RESPONSIVE SWITCH
Robert W. La Warre, 1870 Rose Ave., Lima, Ohio, and Myron D. Markley, 126 Wenthrop Terrace, Meriden, Conn.
Filed Nov. 30, 1959, Ser. No. 856,138
3 Claims. (Cl. 200—61.46)

This invention relates to a speed responsive switch and more particularly to a mechanism having a shaft which is rotated in direct proportional response to the speed of an object and an element which is moved a distance proportional to the speed at which the shaft is rotated.

While a switch embodying the invention may be utilized in any mechanism for the control of an electrical circuit in accordance with the speed of the device with which the switch is used, it will be illustrated in this specification as embodied in a speed responsive switch for the actuation of a signal light on a vehicle.

Most automotive vehicles are equipped with so-called "stop lights," the circuit to such a light being closed by a switch on the vehicle brake pedal in order to signal following drivers that the brakes of the vehicle are being applied. In modern high speed highways, such as turnpikes and throughways, it is often of equal importance that drivers who are approaching a slowly moving vehicle should be made aware of the fact that the vehicle is moving at a low speed rather than at an expected speed.

A speed responsive switch embodying the invention may be assembled in the speedometer drive, for example, by being inserted between the end of the speedometer cable and the speedometer itself and is capable of closing a circuit including a circuit breaker which can be so wired into the stop light of a vehicle, that when the vehicle is moving at a speed of less than, say 20 m.p.h., the stop lights will alternately blink on and off. Such a blinking stop light calls an approaching driver's attention to the fact that the vehicle is proceeding slowly and he can take whatever evasive action is necessary.

It is therefore, the principal object of the instant invention to provide a speed responsive switch which will actuate an electrical circuit at a predetermined speed of the device being measured.

It is another and more particular object of the present invention to provide a speed responsive switch, the elements of which are assembled in a unitary housing which may be inserted as an accessory between the end of a speedometer cable and the speedometer of a vehicle and which is adjustable so that it may be set to be actuated for closing a circuit including a signal light when the speed of the vehicle falls below a selected speed.

It is yet another object of the instant invention to provide a speed responsive switch for a vehicle having an indicator light which is actuated when the speed of a vehicle reaches a predetermined point to energize the signal light for indicating to persons outside the vehicle that the vehicle speed has reached a particular rate.

These and more specific objects and advantages will be better understood by reference to the following specification and the drawings in which.

Figure 1:
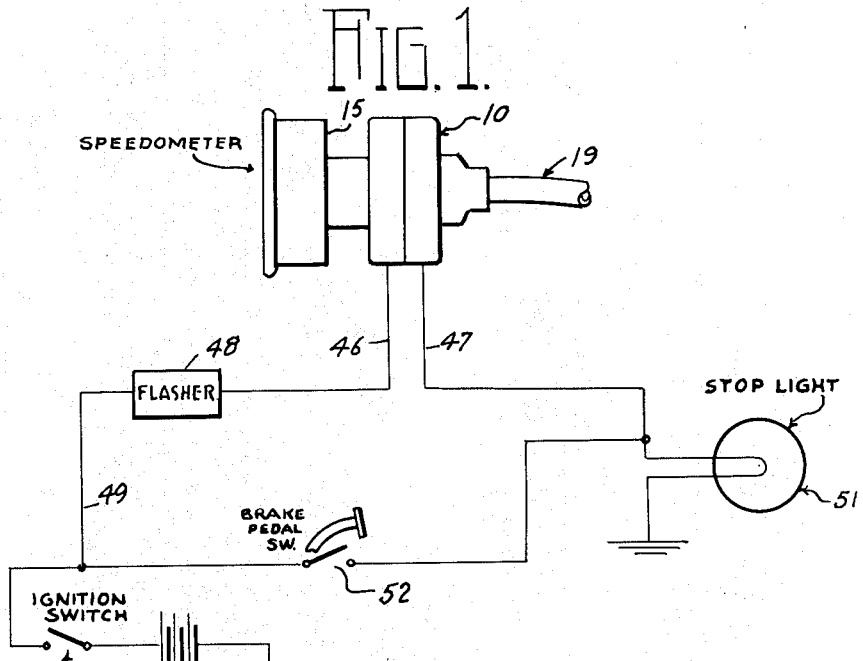
FIG. 1 is a simplified wiring diagram illustrating how a speed responsive switch embodying the invention is connected into the electrical circuit of an automotive vehicle for signaling by means of the vehicle stop light when the speed of the vehicle has reached a predetermined point.
Figure 2:
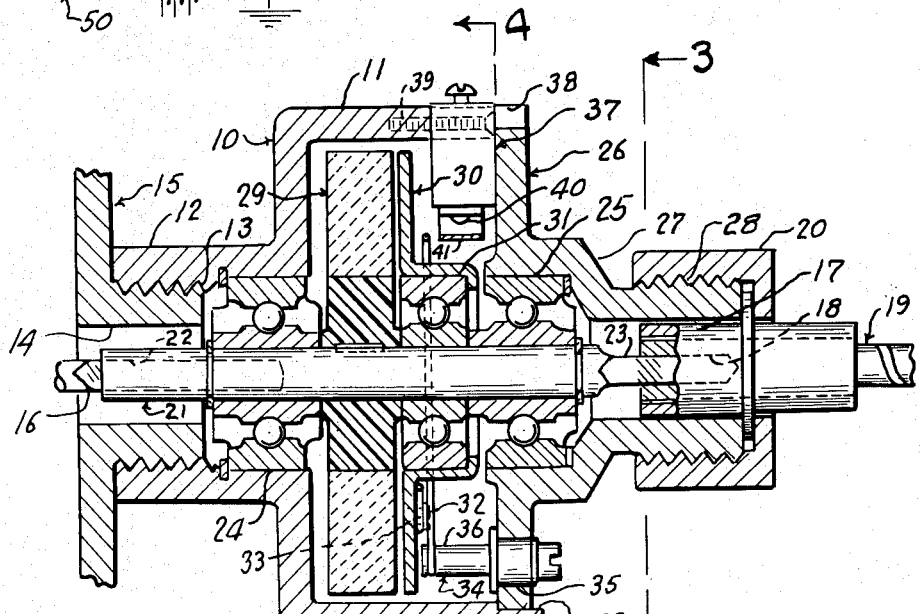
FIG. 2 is a vertical sectional view of a speed responsive switch embodying the invention, in a modification designed for insertion between the speedometer cable of a vehicle and the shaft of the vehicle's speedometer, the switch mechanism being shown on an enlarged scale.

A speed responsive switch embodying the invention in the modification illustrated in the drawings, comprises among other parts, an open cup shaped housing 10. The housing 10 has a hollow cylindrical body 11 and a tubular neck 12, the inner wall of which is provided with threads 13 for coupling the body 10 on a threaded neck 14 of a speedometer generally indicated at 15. The speedometer 15 is conventional in construction and the only part thereof of interest with respect to a mechanism embodying the invention, is the speedometer drive shaft generally indicated at 16 and normally coupled to a driven coupling 17 which has a squared socket 18 and which is attached to the end of a conventional speedometer cable generally indicated at 19. The speedometer cable 19 conventionally is coupled to the speedometer 15 by a coupling nut 20 which would be threaded on the exterior of the threaded neck 14 of the speedometer 15.

A driven shaft 21 which has a squared socket 22 at one end and a squared tang 23 at the other end is journaled in the housing 10 by a bearing 24 and a second bearing 25, the second bearing 25 being carried by a removable and adjustable end plate 26 for the housing 10. The socket 22 in the shaft 21 accepts the squared end of the speedometer shaft 16 and the tang 23 of the shaft 21 is insertable into the socket 18 in the speedometer cable coupling 17. The bearing 24 is mounted in the neck 12 of the housing 10 and the bearing 25 is mounted in a recessed boss 27 of the disc 26, concentric with the housing 10 and with a threaded extension 28 of the boss 27 onto which coupling nut 20 of the speedometer cable 19 is threaded to make the driving connection.

A switch embodying the invention also comprises what might be termed a magnetic coupling and which is intended to provide for movement of a switch actuating element in response to and in proportion to the rate of speed at which the vehicle is moving. The magnetic coupling consists of two elements each of which comprises magnetic material. The first element of the magnetic coupling is a driving element 29 which, in the modification shown, comprises a ceramic disc in which there is embodied a magnetic material and which is, in this particular instance, magnetized. The element 29 is keyed onto the shaft 21 and therefore rotates with the shaft 21. The second element of the magnetic coupling is a driven element 30. The driven element 30 in this embodiment is in the form of a "drag cup" and is also fabricated from a magnetic material and may or may not be magnetized depending upon the polarity of the driving element 29 and the plan configuration of the driving element 29 and driven element 30. The questions of configuration and whether or not the elements are both magnetized are well known in the art and depend entirely upon design and manufacturing considerations. The driven element 30 is journaled for free rotation on the shaft 21 by a bearing 31 mounted upon the shaft 21. Because the speedometer cable 19 is rotated at a speed directly proportional to the speed of the vehicle, the shaft 21 and the driving magnetic element 29 are also rotated proportionately to the vehicle speed. This establishes a magnetic torque in the driven element 30 tending to cause the driven element 30 to rotate with the driving element 29.

A switch embodying the invention also includes means for tending to restrain the rotation of the driven element 30 so that the distance of rotation of the driven element 30 becomes directly proportional to the speed of rotation of the driving element 29. In the embodiment shown in the drawings, the restraining means consists of a coil spring 32 (FIG. 3) which extends around the exterior of the cup shaped portion of the driven element 30 and is caught between a shouldered rivet 33 on the driven element 30 and an adjustable retainer 34 which extends through the end plate 26. The retainer 34 has a cylindrical body 35, the outer end of which is slotted for a screw driver adjustment, and an eccentric extension 36 over the interior end of which the spring 32 is hooked.

A switch generally indicated at 37 is mounted in a recess 38 cut in the cylindrical body 11 of the housing 10, being retained thereby a pair of machine screws 39 which extend through the body of the switch 37 and are threaded into tapped holes in the wall of the cylindrical body 11. The switch 37 has a plunger 40 and an actuator 41. The actuator 41 cooperates with a peg 42 which is set into the face of the driven element 30 to engage or release the switch actuating plunger 40, depending upon the angular distance which the driven element 30 is rotated under the particular magnetic torque generated in the driven element 30 by rotation of the driving element 29.

Figure 3:
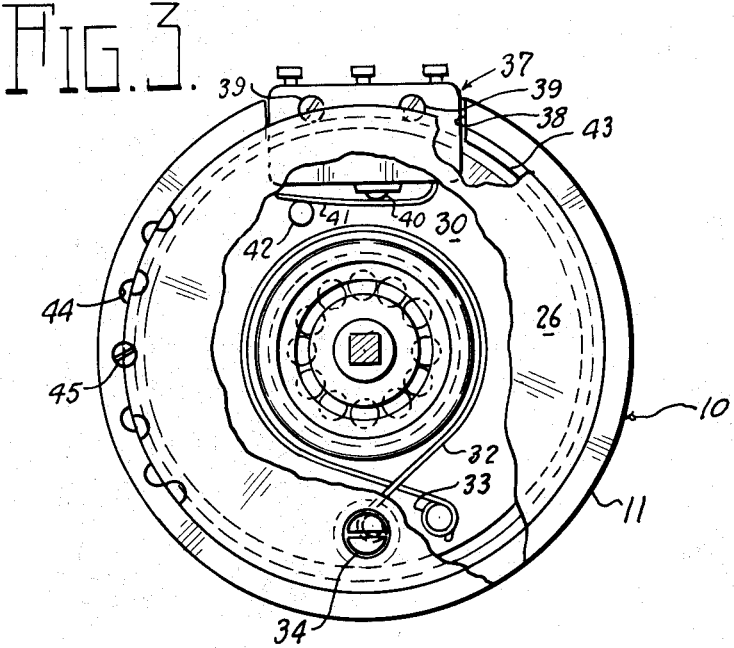
FIG. 3 is a view in end elevation taken from the right side of FIG. 2, generally along the position indicated by the line 3—3, with parts broken away.
Figure 4:
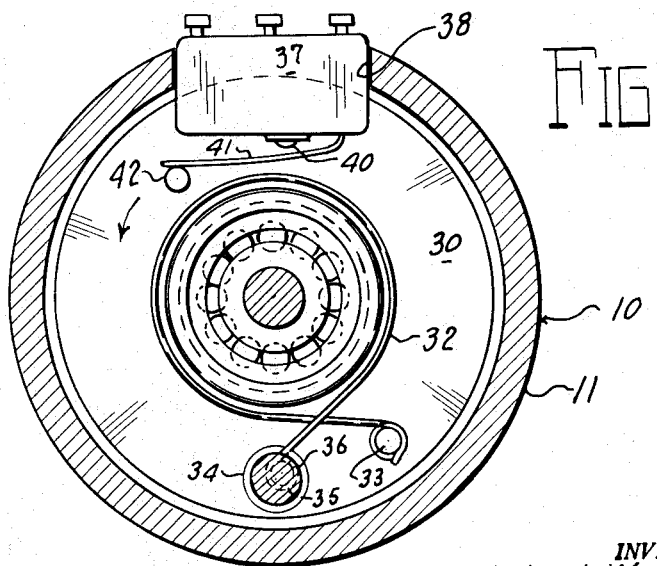
FIG. 4 is a vertical sectional view taken along the line 4—4 of FIG. 2.

A comparison between FIGS. 3 and 4 shows how increased speed of the vehicle and, consequently, a higher speed of rotation of the driving element 29 results in swinging the peg 42 from the position of FIG. 3 to the position of FIG. 4 and, consequently, allowing the actuator 41 to flex downwardly to disengage the switch plunger 40 and open the circuit controlled by the switch 37. Of course, the arrangement could readily be reversed, i.e., the switch could be opened rather than closed at any particular speed. When the vehicle is stopped, the spring 32 holds the driven element 30 at rest position. When the vehicle is operating at low speed, the tension of the spring 32 tends to restrain the driven element 30 against rotation. The stop position is illustrated in FIG. 3 where the spring 32 has pulled the shouldered rivet 33 to the left and returned the driven element 30 in a clockwise direction to its position of rest. When the vehicle commences to move and as its speed builds up, the driving element 29 rotates at a higher rate of speed impressing a greater and greater magnetic torque upon the driven element 30 and rotating it farther and farther against the increasing tension of the spring 32 until the speed of the vehicle passes the level at which it is desired that the switch 37 shall remain closed and the displacement of the peg 42 allows the actuator 41 to flex away from the plunger 40, as is illustrated in FIG. 4.

The end plate 26 rests on an annular shoulder 43 that is cut in the edge of the cylindrical body 11 of the housing 10 and is rotatable relative to the cylindrical body 11 in the recess formed by the shoulder 43. The position of the end plate 26 relative to the cylindrical body 11 and thus the position of the retainer 34 relative to the switch 37, is adjusted by rotating the plate 26. The lip of the housing 11 and the edge of the end plate 26 may be provided with a series of cooperating semi-circular recesses 44 (see FIG. 3) which are equally spaced in the edge of the body 11 and progressively spaced farther from each other in the edge of the plate 26 so that by aligning different ones of the pairs of semi-circular recesses 44 the relative angular positions of the plate 26 and housing 10 may be varied. A locking screw 45 is then set in to which every pair of semi-circular recesses are aligned with each other, in FIG. 3 the central pair being illustrated as being held by the screw 45. This angular rotation of the end plate 26 provides for major variations in the tension of the restraining spring 32 in order to vary the point at which the driven element 30 will be moved to open the switch 37. Finer adjustments in the tension of the restraining spring 32 may be made by rotating the retainer 34 to swing the eccentric extension 36 to one side or the other and thus increase or decrease the tension on the restraining spring 32.

Referring now to FIG. 1, the speedometer cable 19 is coupled to the switch housing 10 and the switch housing 10 in turn coupled to the speedometer 15. Electrical leads from contacts of the switch 37 are connected to lead lines 46 and 47 respectively, the line 46 being connected in turn to a circuit breaker 48 and then by a line 49 to one side of the "ignition switch" 50 of the vehicle. The other lead 47 is connected to the vehicle stop light 51. The ignition switch 50 and stop light 51 are connected to the battery and to ground in the conventional manner. The circuit provided by the lines 46, 47 and 49 establishes a series connection through the ignition switch 50, circuit breaker 48, speed responsive switch 37 and stop light 51 so that when the vehicle speed drops below that to which the setting of the switch embodying the invention corresponds, the circuit breaker 48 is placed in circuit to the stop light 51 and the stop light is caused to blink. The blinking of the stop light 51 signals to approaching drivers that the vehicle is either stopped or is moving at a speed less than some predetermined speed, say 20 m.p.h., in order to warn them of this condition. The circuit for a switch embodying the invention is connected in parallel to the conventional brake pedal switch 52 so that whenever the driver depresses the brake pedal of the vehicle the stop light is lighted continuously regardless of the speed at which the vehicle is traveling.

We claim:

1. A speed responsive switch adapted to be assembled to a speedometer drive shaft normally connected to a speedometer cable, said switch comprising a shaft having one end connected to the speedometer cable and the other end connected to the speedometer drive shaft, said shaft adapted to be rotated by the speedometer cable, a radially extending element mounted on said shaft for rotation therewith, a second radially extending element journaled for free rotation on said shaft, said elements comprising magnetic material and at least one of said elements being magnetized, the second of said elements being responsive to magnetic torque generated by rotation of said first element, a resilient member connected to said second element for tending to restrain said second element against rotation, a switch mounted near said second element, and cooperating means on said switch and said second element for actuating said switch when said second element is rotated a distance corresponding to a certain speed.

2. A switch according to claim 1 in which the resilient member is a coil spring having one end secured to a retainer mounted on and carried by the second member.

3. A speed responsive switch adapted to be mounted on and carried by a vehicle speedometer having a threaded neck and a cable having a nut on one end thereof normally connected to the threaded neck, said switch comprising an open ended, cup-shaped housing having a tubular neck for engaging the threaded neck on the speedometer, a disc-like closure plate for said housing having a threaded extension for receiving the nut on the speedometer cable, a shaft journalled in said housing, means for coupling said shaft to the speedometer cable for rotating said shaft at a rate relative to the speed of said vehicle, an element rotatably mounted on said shaft, a switch mounted on said housing, cooperating means on said element and said switch for actuating said switch when said element is rotated a distance, resilient means tending to restrain said element against rotation, and a magnetic coupling between said shaft and said element for applying magnetic torque to said element proportioned to the speed of rotation of said shaft and the speed of said vehicle.

References Cited in the file of this patent

UNITED STATES PATENTS

| 1,201,564 | Daniel | Oct. 17, 1916 |
|---|---|---|
| 2,811,597 | Havelka | Oct. 29, 1957 |
| 2,920,154 | Allen | Jan. 5, 1960 |